Figure 1:
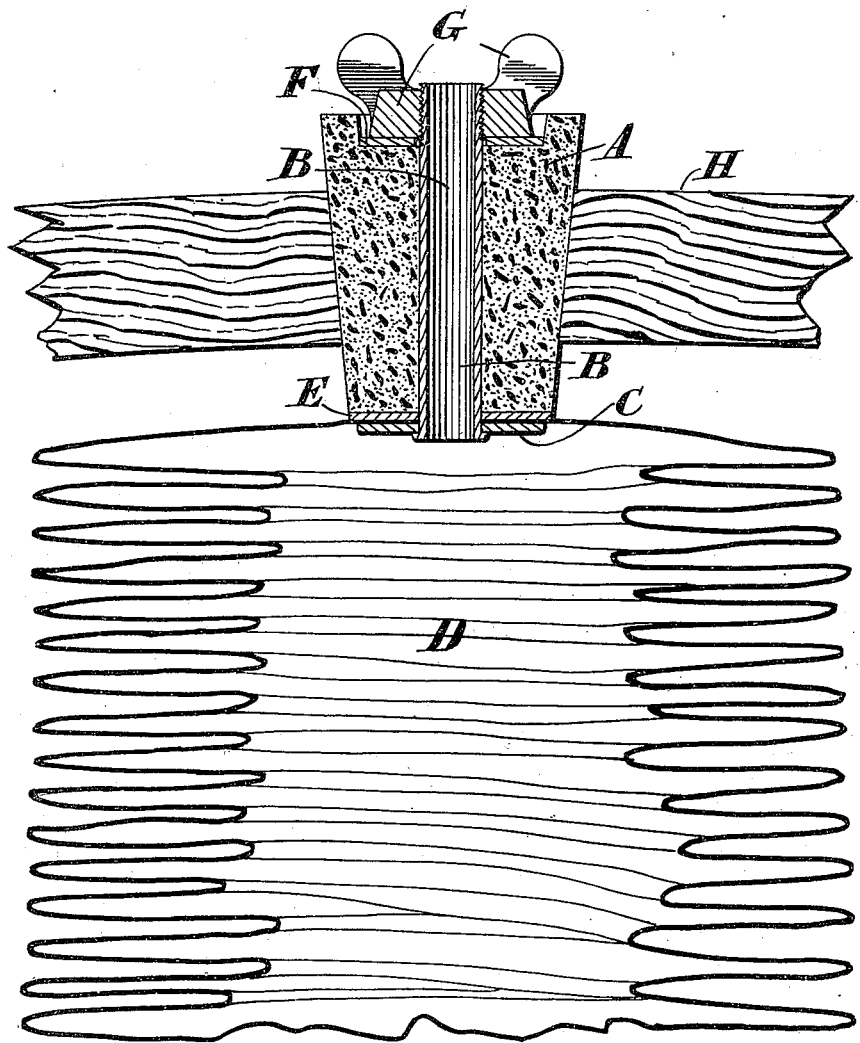

No. 642,960. Patented Feb. 6, 1900.
D. CLIBBORN.
APPARATUS FOR PREVENTING ACCESS OF AIR TO LIQUIDS STORED IN VESSELS.
(Application filed Oct. 8, 1898.)
(No Model.) 2 Sheets—Sheet 1.

WITNESSES
Richard fore Gardner
Robert W. Gardner

INVENTOR
Desmond Clibborn
by Henry Gardner
ATTORNEY

No. 642,960. Patented Feb. 6, 1900.
D. CLIBBORN.
APPARATUS FOR PREVENTING ACCESS OF AIR TO LIQUIDS STORED IN VESSELS.
(Application filed Oct. 8, 1898.)
(No Model.) 2 Sheets—Sheet 2.
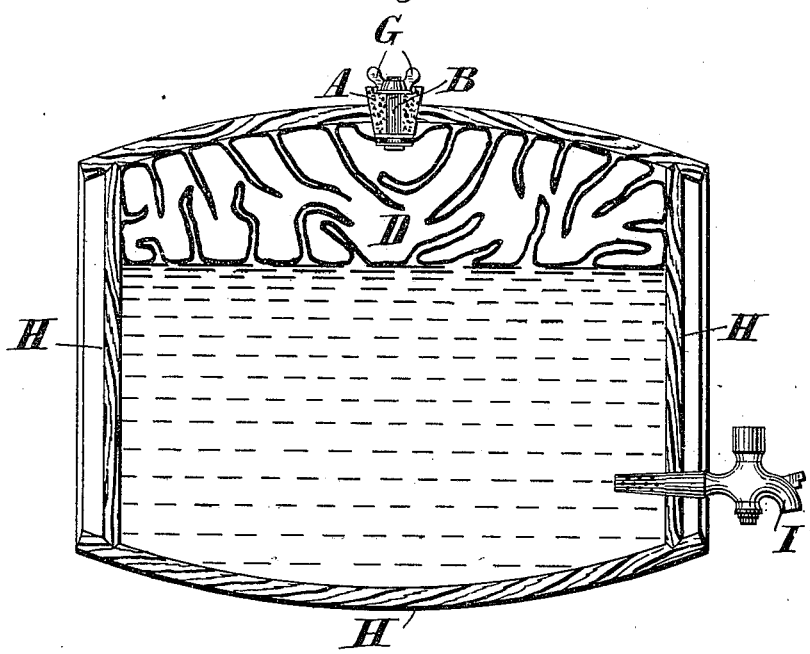
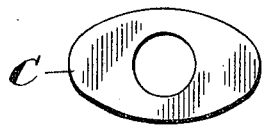
WITNESSES
Richard fore Gardner
Robert W. Gardner
INVENTOR
Desmond Clibborn
by Henry Gardner
ATTORNEY.
THE NORRIS PETERS CO., PHOTO-LITHO., WASHINGTON, D. C.

UNITED STATES PATENT OFFICE.

DESMOND CLIBBORN, OF LONDON, ENGLAND.

APPARATUS FOR PREVENTING ACCESS OF AIR TO LIQUIDS STORED IN VESSELS.

SPECIFICATION forming part of Letters Patent No. 642,960, dated February 6, 1900.

Application filed October 8, 1898. Serial No. 693,033. (No model.)

*To all whom it may concern:*

Be it known that I, DESMOND CLIBBORN, a subject of the Queen of Great Britain, residing at 11 Porchester Terrace, London, England, have invented certain new and useful improvements in means or apparatus for preventing the access of air to liquids stored in vessels when it is intended to draw off the liquids at intervals by means of taps, siphons, or the like, of which the following is a specification.

The usual custom of treating liquids stored in vessels to be drawn off at intervals by means of taps, siphons, or other suitable instruments is to pierce a hole in the vessel at its upper part and insert a spigot, which must be withdrawn whenever the liquid is being drawn off to allow air to pass into the interior of the vessel. This repeated access of air to the liquid contained in the vessel causes it to become deteriorated and not unfrequently so much so as to render it unfit for use.

The object of this invention is to prevent the air from gaining access to the liquid within the vessel and at the same time to provide otherwise for a free flow of the liquid when it is required to be drawn off.

To carry this invention into practice, I take a common tube, open throughout, of any suitable size and material—such as metal, wood, earthenware, &c.—having a screw-thread along the whole or part of its outer surface. Onto this tube, at its lower extremity, I attach an elliptically-shaped plate and for the other a winged-nut screw which can be screwed on or off the tube, as required. I also construct a bag or sack of silk, cotton, or any other suitable material which should be as nearly airtight as possible. The bag may be of any size and shape, but preferably as nearly coinciding with the interior of the vessel containing the liquid as possible and having a slit or buttonhole in some suitable part of it of sufficient size to allow the elliptically-shaped plate and the end of the tube to pass into the interior of the bag. I next take the cork or bung to be used in connection with the vessel in which the liquid is stored and pierce a hole through its entire length of sufficient size to allow the tube before mentioned to pass through, and having passed the tube through and sufficiently enlarged the opening at the upper end of the cork to allow the winged-nut screw to be applied I then put the winged-nut screw onto the end of the tube and screw it on as far as possible, using washers at both ends of the tube, if requisite, to make all the connections between the bag, the tube, the cork, and winged nut air-tight. I then take the bag thus fitted and in a deflated condition and pass it through the bung-hole or other opening in the upper part of the vessel into the interior of the vessel, which has already been filled with the liquor intended to be protected, and press the bung home in the usual way, either by hitting it home or screwing it home, as the form of bung or cork may require. As the liquor is withdrawn through the tap or siphon the air will pass into the interior of the bag and inflate it sufficiently to fill the vacant space caused by the withdrawal of the liquid.

My invention is represented on the annexed sheet of drawings.

Figure 1 is a sectional elevation of the appliances assembled and of about the actual size for an ordinary cask; Fig. 2, a similar reduced scale elevation of the appliances assembled and fitted in a cask from which some of the contents have been withdrawn and showing the bag partly expanded by the free entry of air and filling the area above thereby; Fig. 3, a plan of the oval shape of plate on and by which the expansible bag is held and is fixable to the bung or shive.

A is a bung or shive having an open-ended tube B therein, which tube B carries at its lower end an oval-shaped plate C for holding between it and a washer E, encircling the tube B at the lower part of the bung A, a compressible bag D by its mouth or opening. At the upper part of the bung or shive A is arranged another washer F, which washer F also encircles the tube B, but at its upper or screw-threaded portion a fly-nut G being screwed on the tube B will draw the washers C E toward the washer F, with the bung or shive A between the two washers, and thus hold firmly the bag D between the washers C and E.

In use the bag D, of air-proof material, is inserted in a limp condition through the bung-hole of a cask, such as H, and the bung pushed, screwed, or knocked air-tight therein. On liquid being drawn from the cask by the tap I the level becomes lowered, and the bag in sinking acts as a sucker to draw air in by the tube B, assisted by outside natural pressure of air, whereby the bag D opens out and spreads itself upon the body of the remaining liquid and fills up the vacant space in the cask, this continuing gradually or intermittently as the liquid is drawn off until the cask is empty.

By this invention venting by spigot or vent-peg is not required. Consequently the contents of the cask are not deteriorated as by the usual method, where the air is admitted to enable the contents to flow out when the tap is opened.

What I claim, and desire to secure by Letters Patent, is—

An apparatus for preventing access of air to liquids stored in vessels when being drawn off, consisting of a bung or shive A containing an open-ended tube B having at one end an oval-shaped plate C and at the other or screw-threaded end a fly-nut G; washers E, F arranged at either end of bung or shive A; compressible bag D held by its mouth or opening between plates C and E at the lower end of bung or shive A, as set forth.

In testimony whereof I have hereunto set my hand in presence of two subscribing witnesses.

DESMOND CLIBBORN.

Witnesses:
HENRY GARDNER,
RICHARD CORE GARDNER.